Sept. 18, 1962 W. C. KNUDSEN 3,054,471
ACOUSTIC FILTERS FOR ATTENUATING VERTICALLY PROPAGATED
INTERFERENCE IN BOREHOLE SEISMOLOGY
Filed Jan. 15, 1960

INVENTOR
WILLIAM C. KNUDSEN
BY Frank E. Johnston
Ralph L. Freeland Jr.
ATTORNEYS

United States Patent Office 3,054,471
Patented Sept. 18, 1962

3,054,471
ACOUSTIC FILTERS FOR ATTENUATING VERTICALLY PROPAGATED INTERFERENCE IN BOREHOLE SEISMOLOGY
William C. Knudsen, Fullerton, Calif., assignor to California Research Corporation, San Francisco, Calif., a corporation of Delaware
Filed Jan. 15, 1960, Ser. No. 2,681
7 Claims. (Cl. 181—.5)

This invention relates to a method of improving seismic prospecting. More particularly, it relates to methods and apparatus for attenuating interference waves which are initiated by a source of seismic energy and propagated in the drilling fluid of a borehole in the direction of the axis of the borehole.

Conventional methods of geophysical prospecting consist of employing relatively horizontally spaced recording instruments on the surface of the earth to record elastic dilatation waves produced by a source of seismic energy and either reflected or refracted from interfaces located below the surface. The best results using this method are achieved when the reflecting interfaces are horizontal or near horizontal. However, many surfaces of interest in oil exploration, as for example a fault interface or the flank of a salt dome, are vertical or near vertical. These near vertical interfaces are not satisfactorily defined by conventional surface seismic techniques because the reflection must travel from the bedding interface at the sides of the near vertical structure where it cuts through the horizontally bedded strata or else the reflection must travel from the sides of the near vertical body at such a small angle with the surface that they are not readily detected in the presence of vertically arriving reflections.

Exploration of these near vertical interfaces is best accomplished by locating the source of seismic energy and the seismic detectors below the surface of the earth so that waves may be propagated to and reflected from the near vertical interfaces essentially horizontally. Either a reflection survey or a refraction survey may be utilized and the recorded information processed in a manner similar to conventional surface prospecting. The source of seismic energy and the detecting instruments are all placed under ground either in the same borehole or in different boreholes. This concept of placing both the detecting instrument and the source of seismic energy below the surface is known as borehole seismology.

A serious problem heretofore limiting the success of borehole seismology has been interference waves propagated in the borehole fluid caused by detonation of the seismic charge.

Included in vertically propagated interference waves are tube waves and cable break. In order to understand the method of the invention, an investigation of each of the interference waves is necessary. The so-named "tube wave" is the most objectionable form of vertically propagated interference. The tube wave is propagated through the borehole fluid in the direction of the axis of the borehole by detonation of the seismic energy source. The disturbance decays exponentially to zero in the radial direction from the hole so the wave is largely confined to the fluid in the hole. For frequencies of interest, the particle motion is essentially parallel to the axis of the hole and the amplitude may be considered uniform over the area of the hole. The tube wave is reflected at changes in diameter of the borehole and at the interfaces at the top and bottom of the fluid column. These reflections therefore keep the tube wave reverberating in the borehole, thus prolonging the initial noise level. The "cable break" is the elastic disturbance which travels along the seismic cable. The particle motion of the cable is parallel to the length of the cable and hence parallel to the axis of the hole. It is apparent that in order for borehole seismology to be effective the vertically propagated interference waves must be attenuated in order that the desired signal may be received and recorded in such a manner as to be distinguishable from these interference waves and to then be interpreted.

It is an object of the present invention to effect a method of attenuating the vertically propagated interference waves to the level where the signal-to-noise ratio is such that a successful borehole seismology survey can be completed. It is an object of the invention to disclose methods and apparatus for attenuating vertically propagated interference waves initiated by detonation of a source of seismic energy underground. It is a further object of the invention to show a method of attenuating vertically propagated tube waves and cable break to a level where a successful borehole survey may be made.

In order to reduce the amplitude of the tube wave to a satisfactory low level at the position of the detection instruments, it is necessary to prevent as much tube wave energy as possible from arriving at the detection instruments. This may be accomplished by the twofold process of selectively reflecting energy of the tube wave back toward the source and by dissipating the energy of the tube wave that does get to the vicinity of the detection instruments. This invention reveals a method whereby both selective reflection and energy dissipation attenuation of the tube wave and cable break may be realized to make borehole seismology possible while retaining the mobility of the detectors and the related equipment in the borehole. Briefly, the invention contemplates attenuating the tube wave and cable break by placing in the borehole fluid at predetermined intervals on the seismic cable acoustic filtering elements. These acoustic filtering elements are designed to attenuate the interference waves by a combination of selective reflection and energy dissipation. Since it is impossible to construct a pure reflector or a pure energy dissipator in the present context, there will always be attenuation by both processes. Generally speaking, the acoustic filtering elements are structures with one dimension approaching the diameter of the borehole so that the structure may be placed in the borehole without being hung upon the borehole walls.

A preferred embodiment of the invention contemplates the use of a hollow framework with a diameter as close as possible to the diameter of the borehole consistent with ease of insertion and removal. Placed in this hollow framework is an amount of energy dissipating material, such as circular discs of fine wire screening, thin metal discs with a multitude of small holes, or steel gauze or a similar material. Then density could be greater or less than the density of the borehole fluid. Although there would be some attenuation of the tube wave by reflection, the primary attenuation when utilizing this embodiment of the invention would consist of energy dissipitation caused by the increased energy needed for the particles to move through the restricted openings in the energy dissipating material.

An acoustic filter to be incorporated on the seismic string might consist of a variety of types and sizes of elements. It is sometimes desirable to place reflective elements near the seismic charge and to space the dissipative elements nearer the geophones. For certain sizes of shot and borehole conditions, the opposite arrangement might prove more effective.

Further objects of the invention will become apparent by studying the accompanying drawings which are incorporated in and made a part of this disclosure.

Figure 1:
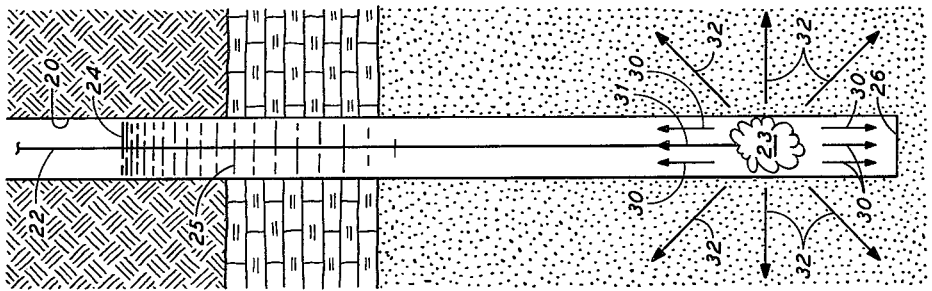
FIGURE 1 is a schematic representation of a vertical section of an underground formation penetrated by a borehole containing a source of seismic energy useful in understanding the present invention.

FIGURE 1 depicts a representative vertical section of an earth formation penetrated by a borehole 20 containing drilling fluid 25 with a solid-liquid interface 26 and a liquid-air interface 24. The seismic cable 22 supports a source of seismic energy 23. When the source of seismic energy 23 is detonated, the elastic body waves 32 move out into the formation until they are reflected or refracted back toward the borehole by bedding interfaces. Also propagated by the same source of energy are the tube waves 30 and the cable break 31. The tube waves travel up and down the drilling fluid 25 to a solid-liquid interface 26 and the liquid-air interface 24 where they are reflected back through the drilling fluid. The cable break travels up cable 22 parallel to the direction of the cable. These vertically propagated interference waves 30 and 31 are large in amplitude compared to the reflected or refracted waves produced by elastic waves 32. Therefore, some means of reducing the amplitude of the interference waves must be found so that the information-bearing signal can be recorded.

Figure 2:
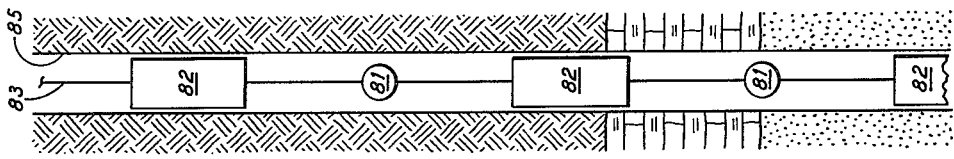
FIGURE 2 is a vertical section of a borehole illustrating an arrangement of apparatus in accord with the present invention.

FIGURE 2 illustrates apparatus in accord with one embodiment of the present invention showing geophones 81 and acoustic filtering elements 82 in a borehole 85. The elements are suspended in the borehole by means of a seismic cable 83.

Figure 3:
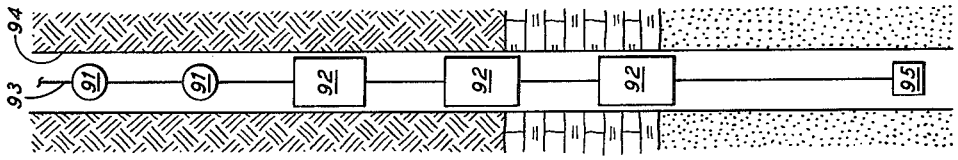
FIGURE 3 is a vertical section of a borehole illustrating an alternative arrangement of apparatus in accord with the present invention.

FIGURE 3 illustrates apparatus in accord with another embodiment of the invention showing geophones 91, acoustic filtering elements 92, and a source of seismic energy 95 in borehole 94.

These two arrangements are not meant to limit the method of the invention but rather to suggest possible arrangements of the acoustic filtering elements in conjunction with the geophones in the borehole. The exact arrangement of this equipment will vary in each particular case because of variables such as the viscosity and density of the drilling fluid, the size of the seismic charge, the distance to the near vertical reflectors, and the number of geophones to be used. These figures do, however, illustrate suitable methods of placing the acoustic filtering elements. The spacing in FIGURE 2 is particularly effective when the tube wave in borehole 85 is initiated by a source of seismic energy located in a borehole (not shown) near borehole 85. When the tube wave is initiated in this manner the tendency is to initiate tube waves over the length of the borehole rather than to initiate it at a particular point, as when the seismic source is located in the same borehole. Therefore, by interspacing the acoustic filters and geophones, a better all-over attenuation is achieved. The arrangement, as illustrated in FIGURE 3, is effective when the source 95 is in the same borehole as the geophones 91. Locating the acoustic filter elements 92 between the geophones 91 and the seismic charge 95 tends to attenuate the tube wave by selectively reflecting unwanted frequency components of the tube wave and increasing the amount of tube wave energy dissipated into heat energy.

Figure 4:
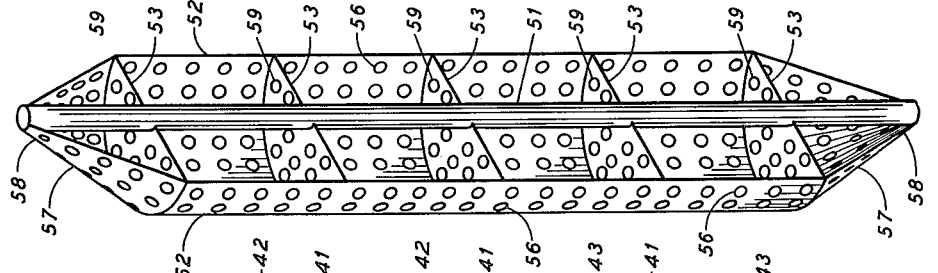
FIGURE 4 is a partial perspective view taken on a longitudinal cross-section of an acoustic filtering element.

FIGURE 4 shows an embodiment in half section of an acoustic filter element. A central longitudinal member 51 is surrounded by a number of circular discs 53 constructed so as to contain a number of small openings. Around the circumference of the discs 53 is a cylinder 52 which has a diameter slightly smaller than the diameter of the borehole and which contains a number of small openings, as indicated by 56. The cylinder extends to cover all the attached discs. On each end of the cylinder 52 is attached a conical member 57 with its apex 58 attached to the central longitudinal member 51. The conical section 57 also contains a number of small openings.

Figure 5:
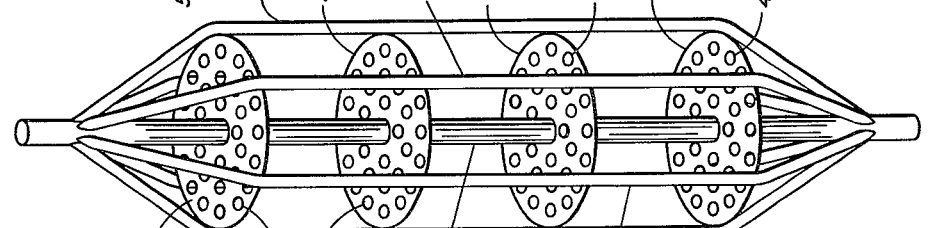
FIGURE 5 is a view of another embodiment of an acoustic filtering element.

FIGURE 5 illustrates an embodiment of an acoustic filtering element. The acoustic filtering element is composed of a central longitudinal member 40 which penetrates a series of circular discs 41, which discs are in turn surrounded by a plurality of longitudinal members 42 on their circumference. A multitude of small openings, as indicated by 43, are formed in the circular discs. The diameter of the element is limited by the diameter of the borehole less an increment for insertion and removal of the elements from the borehole. The particle motion of the tube wave is in a direction parallel to the axis of the hole. By placing the circular discs with the large number of small openings in the viscous fluid, the energy dissipated from the tube wave per unit length of travel is greatly increased, thereby attenuating the tube wave.

Figure 6:
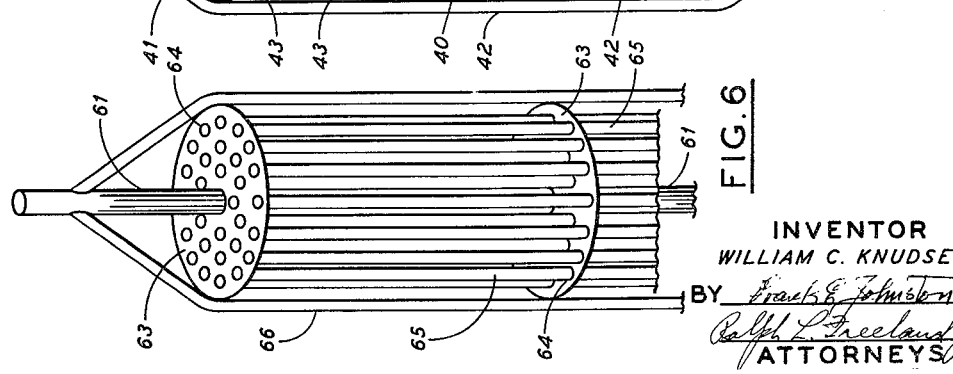
FIGURE 6 is a partial perspective view of another embodiment of an acoustic filtering element.

FIGURE 6 depicts a further embodiment of the invention. Attached to the central longitudinal member 61 are circular discs 63 containing a number of small openings 64. Between the circular disc 63 through the holes 64 tubular members 65 are inserted through which the particles of the drilling fluid must move in order to propagate the tube wave. Longitudinal members 66 are conventionally attached circumferentially on the periphery of the circular disc 63 to add mass and rigidity to the acoustic filtering element. If the element is too light it will follow the motion of the fluid particles and will not be effective in dissipating the tube wave.

As depicted in the figures and as described above, the invention is a means for and a method of attenuating the tube wave and the cable break by placing in the borehole devices that cause energy dissipation and reflection of these vertically propagated interference waves. The tube wave is subject not only to an energy dissipation by being forced to move through the restricted passages but also to reflection by the elements much like the reflection from the air-fluid or formation-fluid interface. Since the acoustic filtering elements are placed so as to isolate the seismic charge from the detection equipment, the reflection in this area away from the detection equipment is also desirable in lowering the tube wave interference.

As is apparent to those skilled in the art, the energy dissipative media need not neecssarily take the form of discs with a multitude of restrictive openings, as depicted in the drawings. Many other types of energy dissipative material could be used to advantage, including a metallic gauze placed in an appropriate container. Sponge or foam rubber can also be used because it is not necessary that the dissipating element have a density greater than water since the reflecting interface need only be a change in density, not necessarily an increase in density.

The number and design of the acoustic filtering elements to be placed on a particular borehole seismic string will, as previously stated, depend greatly on local conditions. The viscosity of the drilling fluid, the size of the seismic charge, and the frequencies to be attenuated must all be taken into consideration in designing and spacing the elements. The other variations and modifications of the invention will, as suggested, be apparent to those skilled in the art, and those obvious variations and modifications are meant to be a part of this disclosure.

I claim:

1. Apparatus for conducting a seismic survey in a fluid-filled borehole, said apparatus adapted to be positioned in said borehole and to receive a desired signal therein, said signal being relatively free from vertically propagated interference waves comprising:

(a) a seismic cable,
(b) a source of seismic energy on said cable,
(c) at least one geophone on said cable,
(d) at least on hollow framework on said cable in said borehole fluid independently spaced apart from said geophone and said source of seismic energy, said framework having a diameter approaching the diameter of the borehole and adapted to contain energy dissipating means, said means having a plurality of restricted openings therein, said framework comprising:
 (i) a central member adapted to be connected to said seismic cable
 (ii) and circumferential longitudinal means connected to said central member, and
(e) energy dissipating means in said framework between said central member and said circumferential longitudinal means, said energy dissipating means having a plurality of restricted openings therein for restricted fluid flow therethrough.

2. Apparatus for attenuating vertically propagated interference waves in borehole seismology comprising a seismic cable, at least one geophone on said cable, a plurality of circular discs having a multitude of small openings therein, a central longitudinal member, a plurality of hollow longitudinal members, a plurality of circumferential longitudinal members, means attaching said discs normal to said central longitudinal members, means attaching said hollow longitudinal members parallel to said central member through the said openings in said discs, means attaching said circumferential longitudinal members to the periphery of said discs and to the said central longitudinal member fore and aft the first and last of said discs, and means attaching said central longitudinal member on the seismic cable independently spaced apart from said geophone.

3. Apparatus for attenuating vertically propagated interference waves in borehole seismology, comprising a seismic cable, a source of seismic energy on said cable, at least one geophone on said cable, a central longitudinal member, a plurality of hollow tubular members, a plurality of circumferential longitudinal members, a plurality of circular discs having a multitude of small openings therein, said discs having a diameter slightly larger than the diameter of said hollow tubular members and one central slot receiving said central longitudinal member, means attaching said discs normal to said central longitudinal member, means attaching said hollow tubular members to said discs through said small openings substantially parallel to said central longitudinal member, means attaching said circumferential longitudinal members to the periphery of said discs and to said central longitudinal member at a point above and below the first and last of said discs and means attaching said central longitudinal member to the seismic cable independent of said source of seismic energy and said geophone.

4. Apparatus for attenuating vertically propagated interference waves in borehole seismology comprising a seismic cable, at least one geophone on said cable, a source of seismic energy on said cable, a central longitudinal member, said member adapted to be attached to said cable, a plurality of circular discs having a multitude of small perforations therein, a plurality of circumferential longitudinal members, means attaching said discs at predetermined intervals on said central longitudinal member normal to said central longitudinal member, means attaching said circumferential longitudinal members to the periphery of said discs and to the said central longitudinal member fore and aft the first and last of said discs, and means attaching said central longitudinal member on said seismic cable spaced apart from said geophone and said source of seismic energy.

5. Apparatus for attenuating vertically propagated interference waves in borehole seismology comprising a seismic cable, at least one geophone on said cable, a source of seismic energy on said cable, a plurality of circular discs having a multitude of small perforations therein, a central longitudinal member, means attaching said discs to said central longitudinal member, a perforated cylinder of approximately the same diameter as the diameter of the said discs, means attaching said cylinder circumferentially on said discs and central longitudinal member, a pair of perforated cones, means attaching said cones to said cylinder and said longitudinal member so that the base of one of said pair of cones is secured to each end of said cylinder and the apex of each of said cones points away from said cylinder and is secured to the said central longitudinal member, means attaching said central longitudinal member on said seismic cable spaced apart from said geophone and said source of seismic energy.

6. Apparatus as in claim 5 wherein the circular discs are composed of wire screening.

7. Apparatus as in claim 5 where the spaces between the circular discs are filled with wire gauze.

References Cited in the file of this patent
UNITED STATES PATENTS

| | | |
|---|---|---|
| 1,541,275 | Powell | June 9, 1925 |
| 2,191,119 | Schulmberger | Feb. 20, 1940 |
| 2,350,371 | Smith | June 6, 1944 |
| 2,502,020 | Olson | Mar. 28, 1950 |
| 2,714,937 | Houle | Aug. 9, 1955 |
| 2,742,629 | Summers et al. | Apr. 17, 1956 |
| 2,757,358 | Ely | July 31, 1956 |
| 2,771,960 | Smith | Nov. 27, 1956 |
| 2,794,512 | Martin | June 4, 1957 |
| 2,916,101 | Naman | Dec. 8, 1959 |

UNITED STATES PATENT OFFICE
CERTIFICATE OF CORRECTION

Patent No. 3,054,471 September 18, 1962

William C. Knudsen

It is hereby certified that error appears in the above numbered patent requiring correction and that the said Letters Patent should read as corrected below.

Column 2, line 44, for "upon" read -- up on --; line 53, for "Then" read -- The --; column 4, line 53, for "neecssarily" read -- necessarily --; column 5, line 6, for "on", first occurrence, read -- one --.

Signed and sealed this 19th day of February 1963.

(SEAL)
Attest:

ESTON G. JOHNSON
Attesting Officer

DAVID L. LADD
Commissioner of Patents